United States Patent [19]

Nelson

[11] Patent Number: 4,821,389
[45] Date of Patent: Apr. 18, 1989

[54] METHOD OF MAKING A PIN FIN HEAT EXCHANGER

[75] Inventor: Richard D. Nelson, Austin, Tex.

[73] Assignee: Microelectronics and Computer Technology Corporation, Austin, Tex.

[21] Appl. No.: 126,648

[22] Filed: Dec. 1, 1987

[30] Foreign Application Priority Data

Dec. 3, 1986 [GB] United Kingdom ............... 8628967

[51] Int. Cl.$^4$ ........................................... B21D 53/02
[52] U.S. Cl. .................................. 29/157.3 R; 29/424; 29/458; 29/527.2; 165/804
[58] Field of Search .................. 29/157.3 R, 412, 423, 29/424, 458, 527.2, 527.3, 527.4, 157.3 A, 157.3 AH, 157.3 B, 157.3 C, 157.3 D, 157.3 H, 157.3 V, 413, 414, 415, 416, 417, 459; 437/902; 357/81, 82, 83; 165/804

[56] References Cited

U.S. PATENT DOCUMENTS

| | | | |
|---|---|---|---|
| 3,678,995 | 7/1972 | Collard | 437/902 |
| 3,805,123 | 4/1974 | Rieger | 437/902 |
| 4,034,468 | 7/1977 | Koopman | 437/902 |
| 4,373,255 | 2/1983 | Goronkin | 437/402 |
| 4,555,162 | 11/1985 | Aldrich et al. | 29/157.3 R |

FOREIGN PATENT DOCUMENTS

| | | | |
|---|---|---|---|
| 0140119 | 5/1985 | European Pat. Off. | 437/902 |
| 0096789 | 6/1984 | Japan | 437/902 |
| 0135737 | 8/1984 | Japan | 437/902 |
| 1211663 | 11/1970 | United Kingdom | 437/902 |

Primary Examiner—P. W. Echols
Assistant Examiner—Irene Cuda
Attorney, Agent, or Firm—Fulbright & Jaworski

[57] ABSTRACT

A pin fin heat exchanger is made by wrapping a thermally conductive wire having a coating thereon around a mandrel thereby forming a multilayer coil. The coating is fused together for holding the wires together. The method includes cutting a section out of the coil providing a plurality of generally parallel wires having first and second ends and placing the cut section between an object and a wall for transferring heat therebetween with the first ends engaging the object and the second ends engaging the wall. Thereafter the coating is removed from the wires such as by solvents. The ends of the wires may be soldered or may be lapped to provide a convex surface to provide good heat transfer.

12 Claims, 4 Drawing Sheets

METHOD OF MAKING A PIN FIN HEAT EXCHANGER

BACKGROUND OF THE INVENTION

The present invention is directed to a method for making and using arrays of short, small cross section wires or pins as pin fin heat exchangers. The heat exchangers are particularly useful for cooling electronic chips. The present invention provides a way of achieving mass produced arrays of high efficiency heat exchangers or heat sinks which are low cost compared to the conventional heat sinks produced by liquid or reactive ion etching of silicon. In addition, the pin arrays compensate for any uneven thermal expansion or contraction between the manifold and the chip. Furthermore, the arrays may be made in various shapes and sizes for meeting various application requirements.

SUMMARY

The present invention is directed to the method of making a pin fin heat exchanger by wrapping a thermally conductive wire, having a coating, around a mandrel forming a multilayer coil and fusing the coating together for holding the wires together. Thereafter, a section is cut out of the coil, providing a plurality of generally parallel wires or pins having first and second ends. The cut section is inserted between an object and a wall for transferring heat therebetween with the first ends engaging the object and the second ends engaging the wall. Thereafter, the coating may be softened or removed depending on the application, from the wires forming a heat exchanger between the object and the wall.

Another object of the present invention is wherein one or both of the ends are secured to their engaging surface such as by soldering or pressing.

Still a further object of the present invention is wherein at least one of the first and second ends are lapped for providing a convex surface for good thermal contact of the ends. The convex surfaces will provide a good contract and the curved wires will tend to spring back thereby maintaining the contact.

Yet a still further object of the present invention is wherein preferably the coating is a plastic, fused together by heat, and is removed by a solvent.

Yet a still further object of the present invention is the method of making a pin fin heat exchanger for an electronic chip by wrapping a metal wire, having a coating of plastic or other suitable material, around a mandrel forming a multilayered coiled and fusing the plastic coating together for holding the coil wire together. A section is cut out of the coil, preferably rectangular, for providing a plurality of generally parallel wires or pins fused together having first and second ends. The section is placed between an electronic chip and a manifold wall for transferring heat therebetween with the first ends engaging the chip and the second ends engaging the wall. Thereafter the coating is removed from the wires by a solvent thereby forming a heat exchanger between the chip and the manifold.

Still a further object of the present invention is wherein the fluid manifold may be secured to the chip and about the wires for receiving and flowing a fluid through the manifold and around the wires.

Other and further objects, features and advantages will be apparent from the following description of presently preferred embodiments of the invention, given for the purpose of disclosure, and taken in conjunction with the accompanying drawings.

DESCRIPTION OF THE PREFERRED EMBODIMENT

While the present invention will be described in connection with its use as a heat exchanger for an electronic chip for purposes of illustration only, the present invention may be used in other applications in which it is desired to transfer heat between one object and a manifold.

Figure 1:
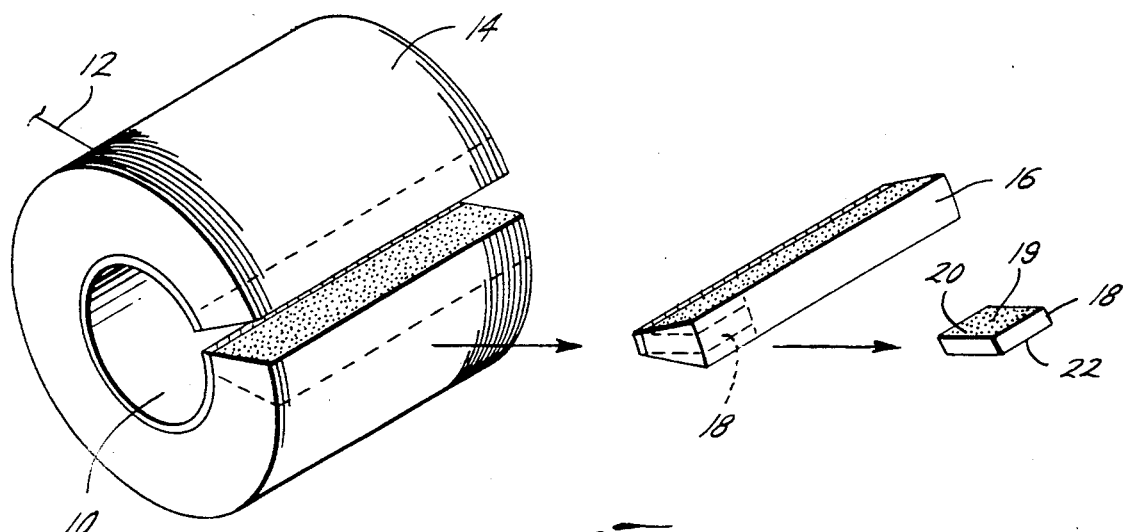
FIG. 1 is a perspective view of a wire coil in which a section has been cut out to form a pin array.

Referring now to the drawings, and particularly to FIG. 1, the reference numeral 10 indicates a mandrel on which a thermally conductive wire 12 is wound or wrapped to form a multilayered coil 14. While the mandrel 10 is shown as being round, other shapes may be used such as a square mandrel or a mandrel having an elongated rectangular cross section. The wire 12 may be of any suitable cross-sectional shape, such as rectangular or hexagonal, but round is preferred as it is readily available. The wire 12 has a coating thereon of any suitable material which may be fused together such as plastic, lacquer, paint, polyvinylchloride, or glue. The thickness of the coating may be of any desirable amount, such as five mils, to form the desired microchannel flow path. The wire is of any size that is suitable for forming a microchannel heat exchanger and typically would be a round wire of a diameter of two to 20 mils. The wire may be of any thermally conductive material and metals such as copper, gold, or silver are satisfactory.

After the multilayer coil 14 is formed, the coating on the wire 12 is fused together for holding the wires 12 together after sections are cut out of the coil 14. Depending upon the composition of the coating 21 (FIG. 2), the fusing may be accomplished by pressure by tightly winding the wire 12 around the mandrel 10 or by heating the coil 14 after the formation of the coil 14.

After the formation of the coil 14 and fusing of the coating on the wires 12 together, sections, such as section 16, are cut out of the coil 14. In the embodiment shown, the coil 14 is circular, and the sections 16 are pie-shaped. While pie-shaped sections 16 could be used for a heat exchanger, rectangular sections are preferred and rectangular sections 18 may be further cut out of the pie-shaped section 16 to form a plurality of generally parallel wires or pins 19 having first and second ends in parallel faces 20 and 22. The length of wires may be of any suitable length depending on the amount of heat to be transferred. For example, 100 mils length may be suitable for an electronic chip 24. The wires 19 are held together since the coating 21 has been fused together.

Figure 2:
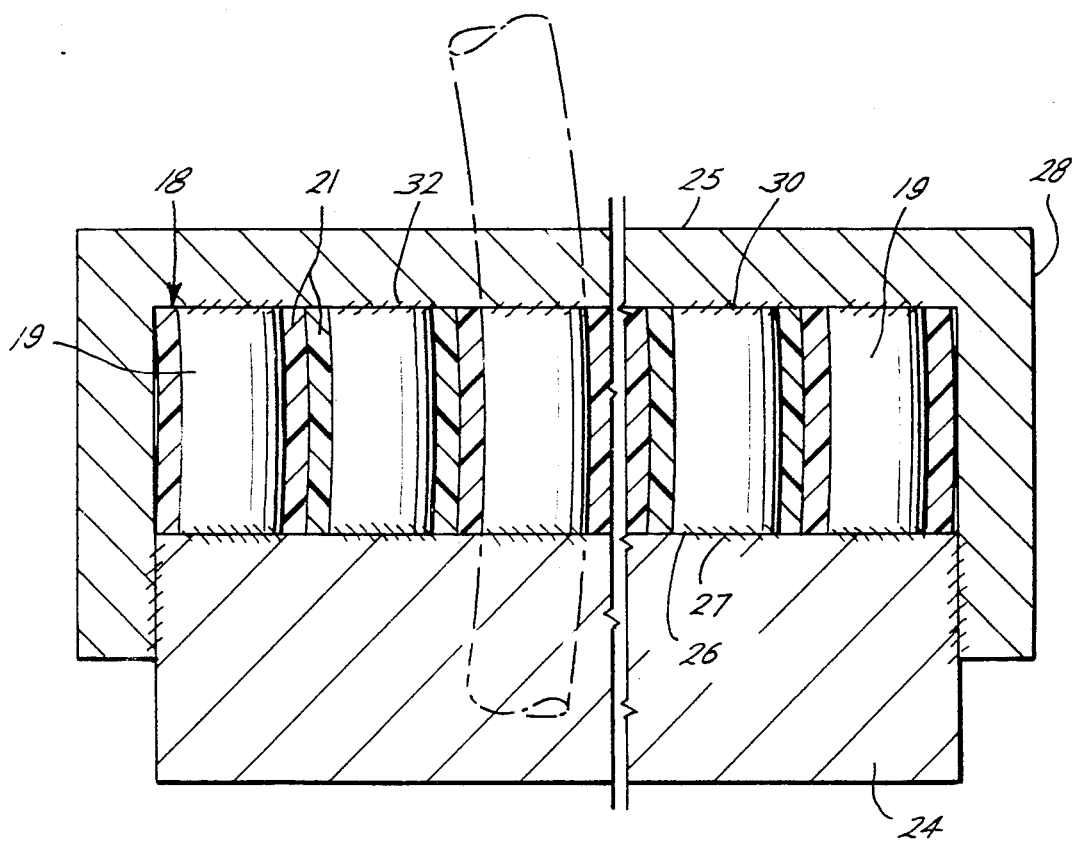
FIG. 2 is an enlarged cross-sectional view of the sectioned array secured between a chip and a manifold wall.

Referring now to FIG. 2, the section or pin array 18 is placed between an object such as an electronic chip 24 and a wall 25 such as a portion of a manifold 28 which is secured to the chip 24 such as by soldering. One, or both, of the ends of the wires or pins 19 are secured to their contacting surfaces. Thus, first ends 26 of the wires 19 may be secured by solder 27 to the surface of the chip 24 and the second ends 30 may be secured to the wall 25 by soldering 32. The small diameter of the wires or pins 19 reduces the stress associated with large area soldered attachments of copper wires to a silicon chip 24. It is noted in FIG. 2 that the covering 21 of the wires 19 hold the section 18 together.

Figure 3:
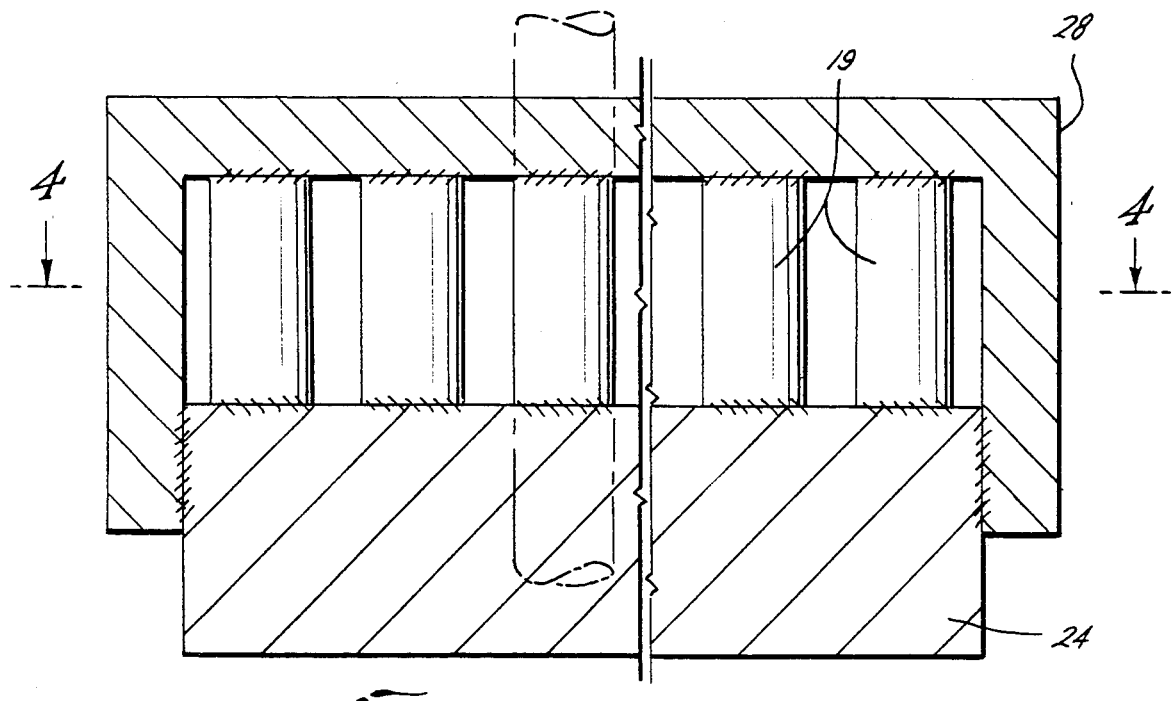
FIG. 3 is a cross-sectional view similar to FIG. 2 in which the coatings around the wires have been removed.
Figure 4:
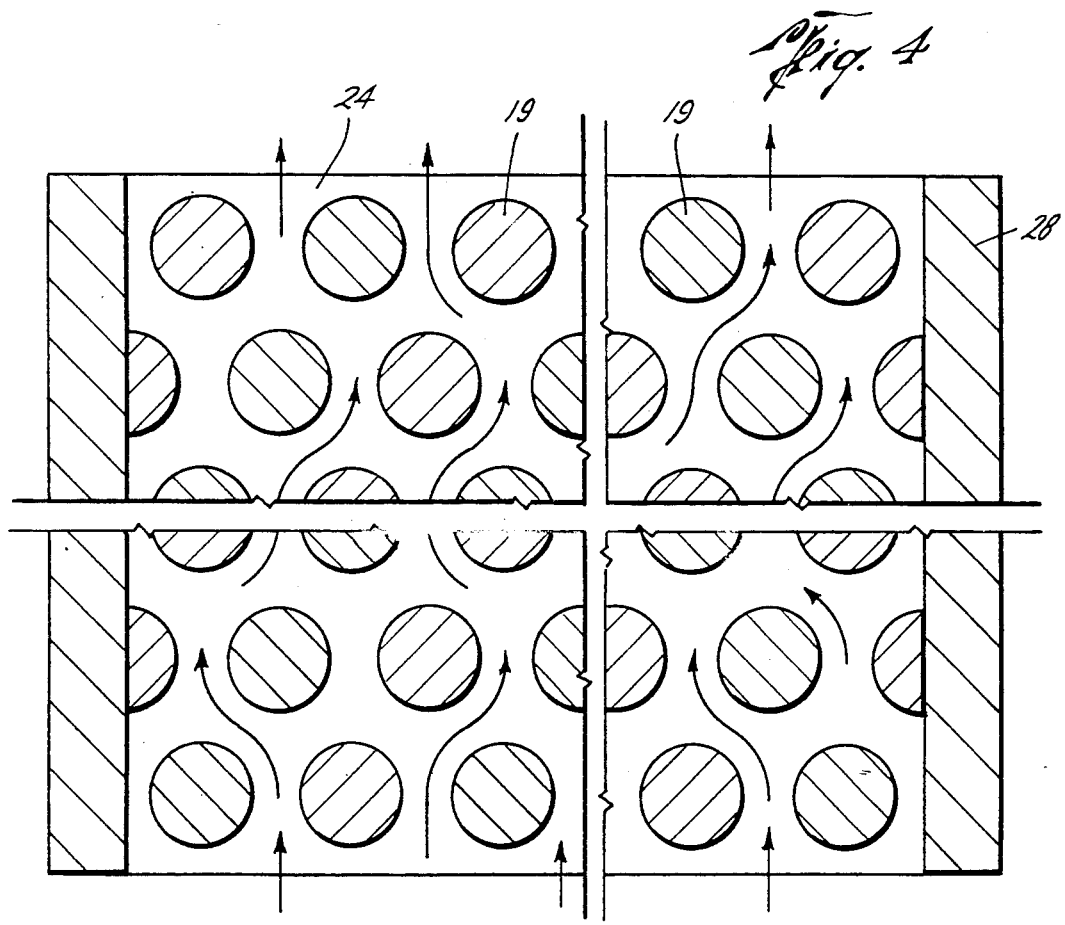
FIG. 4 is a cross-sectional view taken along the line 4—4 of FIG. 3.

Referring now to FIGS. 3 and 4, after the step of FIG. 2 has been performed, the coating 21 is removed by any suitable process such as by heat or by using a solvent such as acetone which is flowed through the manifold 28 to remove the coating 21. Thus, a pin fin heat exchanger is formed, and in use a suitable liquid or gas may be flowed through the manifold 28 in a heat exchange relationship with the wires 19, as indicated by the arrows in FIG. 4, to cool the electronic chip 24.

Figure 5:
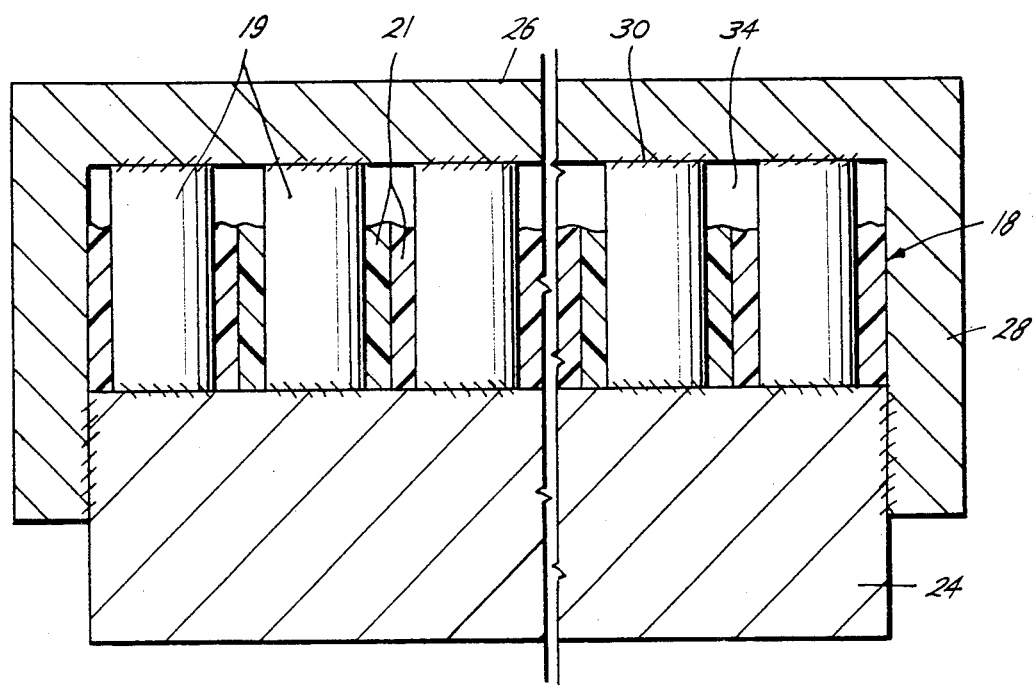
FIG. 5 is a cross-sectional view similar to FIG. 2 in which a portion of the coating has been removed.

In order to speed up the removal of the coating 21 from the pins 19, a portion of the coating 21 may be removed from one of the ends of the pins 19, as shown in FIG. 5, such as ends 30, prior to their placement between the manifold 28 and the chip 24 such as by dipping the pins 19 into a solvent. However, a sufficient amount of the coating 21 is allowed to remain in order to hold the wires 19 together for securing them between the manifold 28 and the chip 24. Thereafter, the flow of solvent through the spaces 34 will contact a greater area of the coating 21 and more rapidly remove the coating 21.

Other and further embodiments of the present invention may be provided and will be further described hereinafter wherein like parts are similarly numbered but with the addition of the suffixes "a" and "b".

Figure 6:
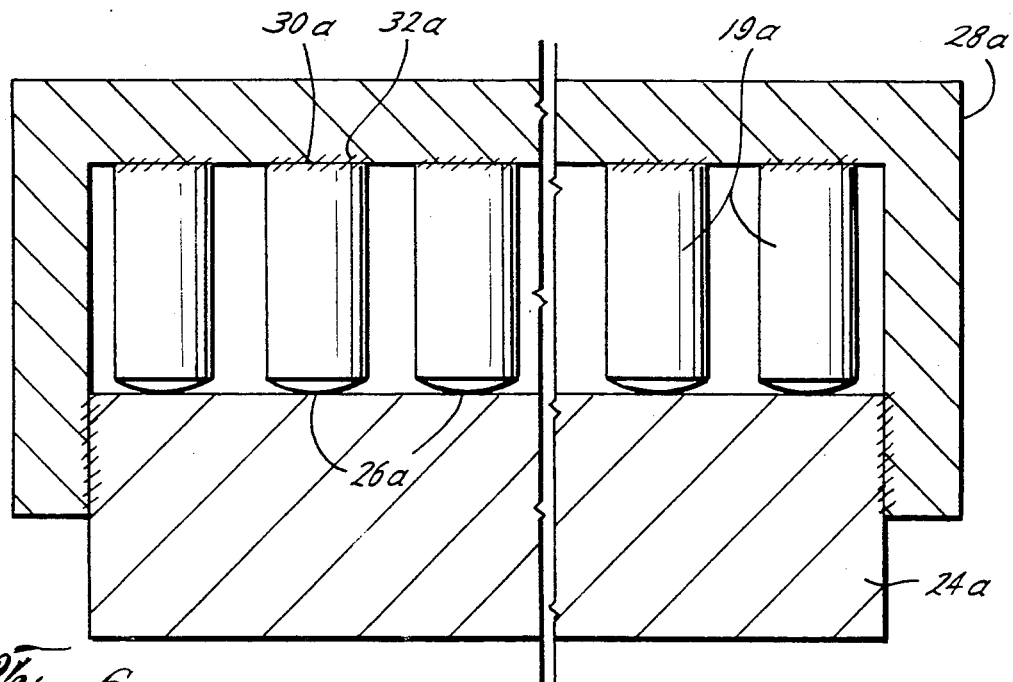
FIG. 6 is an enlarged cross-sectional view showing another method of connecting the pin fin heat exchanger of the present invention between a chip and an enclosed manifold.

In the embodiment shown in FIGS. 2-4, each of the ends of the pins 19 were shown as secured to the chip 24 and the manifold 28, respectively. However, it is not necessary that both ends of the wires be connected. Thus, referring now to FIG. 6, while one end of the wires 19a, such as the second ends 30a, may be secured by soldering 32a to the manifold 28a, the first ends 26a are not secured. Instead, the ends 26a are lapped to provide a slightly convex surface at the ends 26a which will provide a good contact for each of the ends 26a. Preferably, the lapping is performed on the first ends 26a while they are still in position in the section 18. The contact of convex ends 26a will be maintained to accommodate thermal expansion. Also the wires 19a will tend to straighten up from their slightly curved contours, due to their being in the coil 14, to spring back towards straightness, increasing the contact of the convex ends 26a with the surface of the chip 24a. Of course, the ends 26a could be secured to the chip 24a and the ends 30a could be lapped to provide a convex surface engaging the manifold 28a.

Figure 7:
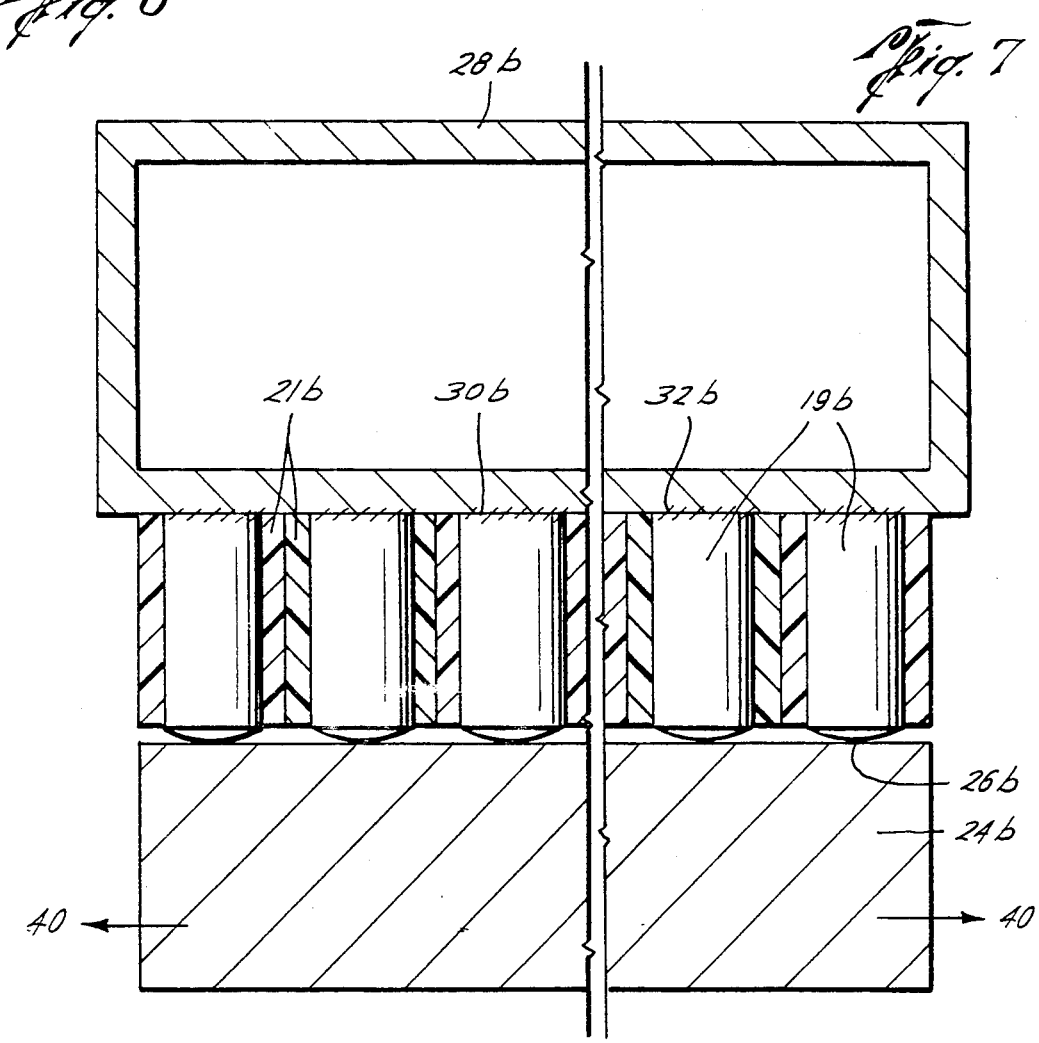
FIG. 7 is an enlarged cross-sectional view showing the use of the pin fin heat exchanger of the present invention connected between a chip and an exterior manifold.

Referring now to FIG. 7, the manifold 28b is shown as an enclosed manifold secured to the second ends 30b of the wires 19b. The manifold 28b is not connected to the electronic chip 24b but is separated therefrom. The first ends 26b of the wires 19b are not secured to the chip 24b but are lapped to provide contact therebetween. The structure of FIG. 7 shows the ability of the small diameter wires 19b to compensate for uneven thermal expansion of the chip 24b and the manifold 28b. That is, while the chip 24b may expand in the directions indicated by the arrows 40, because of its increased temperature, the manifold 28b may have a different coefficient and will not be similarly affected. As indicated, the lapped ends 26b will accommodate the difference in thermal expansion between the chip 24b and the manifold 28b while transferring heat from the chip 24b to the manifold 28b. In this embodiment, the coating 21b need not be removed. However, the coating 21b may be softened, such as by solvent, for increasing the flexibility of the structure. In this case, the manifold 28b would be clamped by means not shown in the chip 24b.

The method of making the pin fin microchannel heat exchanger of the present invention is apparent from the foregoing description. However, the method includes wrapping a thermally conductive wire, having a coating, around a mandrel forming a multilayered coil, and fusing the coating together for holding the wires together. Thereafter the method includes cutting a section out of the coil providing a plurality of generally parallel wires having first and second ends and placing the cut section between an object and a wall for transferring heat therebetween with the first ends engaging the object and the second ends engaging the wall. Thereafter the coating may be removed from the wires depending on the application. The method also includes soldering one or both of the ends to their engaging surface. The method includes lapping one of the first and second ends for providing a convex surface for thermal contact. The covering may be a plastic and may be fused together by heat and removed by a solvent. The pin fin heat exchanger may be used to cool an electronic chip and be connected to an enclosed or external manifold in which a fluid is passed therethrough for cooling the chip.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts, and steps of the method, will be readily apparent to those skilled in the art and which are encompassed within the spirit of the invention and the scope of the appended claims.

What is claimed is:

1. The method of making a pin fin heat exchanger comprising,
    wrapping a thermally conductive wire having a coating around a mandrel forming a multilayered coil,
    fusing the coating together for holding the wires together,
    cutting a section out of the coil providing a plurality of generally parallel wires having first and second ends, and
    placing the cut section between an object and a wall for transferring heat therebetween with the first ends engaging the object and the second ends engaging the wall.

2. The method of claim 1 wherein the coating is removed.

3. The method of claim 1 wherein the coating is a plastic and is removed by a solvent.

4. The method of claim 1 wherein the first ends are soldered to the object.

5. The method of claim 1 wherein the second ends are soldered to the wall.

6. The method of claim 1 wherein at least one of the first and second ends are lapped for providing a convex surface for thermal contact.

7. The method of claim 1 wherein the coating is fused together by heat.

8. The method of making a pin fin heat exchanger for an electronic chip comprising, wrapping a metal wire having a plastic coating around a mandrel forming a multilayered coil, fusing the plastic coating together for holding the coiled wire together, cutting a section out of the coil providing a plurality of generally parallel wires fused together, said wires having first ends on one side of the section and second ends on a second placing the cut section between an electronic chip and a manifold wall for transferring heat therebetween with the first ends engaging the chip and the second ends engaging the wall, and removing the coating from the wires by a solvent.

9. The method of claim 8 including, securing the manifold wall to the chip and about the wires, and passing a fluid through the manifold and about the wires.

10. The method of claim 8 including, soldering the second ends to the manifold wall.

11. The method of claim 8 wherein the coating is removed by a solvent.

12. The method of claim 9 wherein at least one of the first and second ends provide a convex unsecured surface for thermal contact.

* * * * *